(12) United States Patent
Zhu et al.

(10) Patent No.: US 10,827,140 B2
(45) Date of Patent: Nov. 3, 2020

(54) PHOTOGRAPHING METHOD FOR TERMINAL AND TERMINAL

(71) Applicant: Huawei Technologies Co., Ltd., Shenzhen (CN)

(72) Inventors: Congchao Zhu, Beijing (CN); Wei Luo, Shanghai (CN); Cheng Du, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/342,299

(22) PCT Filed: Dec. 1, 2016

(86) PCT No.: PCT/CN2016/108293
§ 371 (c)(1),
(2) Date: Apr. 16, 2019

(87) PCT Pub. No.: WO2018/072267
PCT Pub. Date: Apr. 26, 2018

(65) Prior Publication Data
US 2019/0253644 A1    Aug. 15, 2019

(30) Foreign Application Priority Data

Oct. 17, 2016    (CN) .......................... 2016 1 0905284

(51) Int. Cl.
*H04N 5/357* (2011.01)
*H04N 5/235* (2006.01)
(Continued)

(52) U.S. Cl.
CPC ............. *H04N 5/357* (2013.01); *H04N 5/232* (2013.01); *H04N 5/235* (2013.01);
(Continued)

(58) Field of Classification Search
CPC ...... H04N 5/357; H04N 5/235; H04N 5/2351; H04N 5/23245; H04N 5/347; H04N 5/2258
See application file for complete search history.

(56) References Cited

U.S. PATENT DOCUMENTS 9,414,037 B1    8/2016  Solh
2002/0101523 A1  8/2002  Glenn et al.
(Continued)

FOREIGN PATENT DOCUMENTS

CN    1522051 A    8/2004
CN    101754028 A    6/2010
(Continued)

*Primary Examiner* — Ahmed A Berhan
(74) *Attorney, Agent, or Firm* — Slater Matsil, LLP

(57) ABSTRACT

A photographing method for a terminal that comprises a monochrome camera and a color camera, the method including simultaneously photographing a same to-be-photographed scene using the monochrome camera and the color camera and separately obtaining K frames of images, where the monochrome camera uses a full-size operation mode, where the color camera uses a binning operation mode, and where K≥1, obtaining a first image corresponding to the monochrome camera and a second image corresponding to the color camera, obtaining high-frequency information according to the first image, obtaining low-frequency information according to the second image, and fusing the first image and the second image according to the high-frequency information and the low-frequency information, and generating a composite image of the to-be-photographed scene.

17 Claims, 8 Drawing Sheets

(51) Int. Cl.
*H04N 5/232* (2006.01)
*H04N 5/243* (2006.01)
*G06T 3/00* (2006.01)
*H04N 5/347* (2011.01)
*H04N 5/225* (2006.01)

(52) U.S. Cl.
CPC ......... *H04N 5/2351* (2013.01); *H04N 5/2354* (2013.01); *H04N 5/23245* (2013.01); *H04N 5/243* (2013.01)

(56) References Cited

U.S. PATENT DOCUMENTS

| | | | |
|---|---|---|---|
| 2011/0234864 A1* | 9/2011 | Inokuma | H04N 9/045 348/280 |
| 2013/0016251 A1* | 1/2013 | Ogasahara | H04N 5/2258 348/238 |
| 2015/0278996 A1* | 10/2015 | Tsutsumi | G06T 3/4038 348/47 |
| 2017/0099435 A1 | 4/2017 | Chen et al. | |

FOREIGN PATENT DOCUMENTS

| | | |
|---|---|---|
| CN | 105049718 A | 11/2015 |
| CN | 105430361 A | 3/2016 |
| CN | 105701765 A | 6/2016 |
| CN | 105827965 A | 8/2016 |
| JP | 2004147229 A | 5/2004 |
| WO | 2016061757 A1 | 4/2016 |

\* cited by examiner

PHOTOGRAPHING METHOD FOR TERMINAL AND TERMINAL

CROSS REFERENCE TO RELATED APPLICATIONS

This application is a national stage of International Application No. PCT/CN2016/108293, filed on Dec. 1, 2016, which claims priority to Chinese Patent Application No. 201610905284.8, filed on Oct. 17, 2016. Both of the aforementioned applications are hereby incorporated by reference in their entireties.

TECHNICAL FIELD

Embodiments of the present invention relate to the image processing field, and more specifically, to a photographing method for a terminal and the terminal.

BACKGROUND

Limited by dimensions and costs of a terminal, both a camera lens and a sensor of the terminal have a relatively small area, and quality of a photographed image is relatively poor. In a night scene or a low illumination environment, because of weak light, quality of a photographed image is even worse.

To improve a photographing effect for the terminal, the terminal currently uses a binning technology to improve photographing luminance for the terminal in the night scene or the low illumination environment, so as to improve image quality. That is, adjacent pixels are combined into one pixel for use, to improve light sensitivity in a low light environment. However, such a singular binning technology may lose a high-frequency detail of an image and severely reduce the image quality.

SUMMARY OF THE INVENTION

Embodiments of the present invention provide a photographing method for a terminal and the terminal, so as to improve image quality.

According to a first aspect, a terminal is provided, including a monochrome camera and a color camera, configured to simultaneously photograph a same to-be-photographed scene, to separately obtain K frames of images, where the monochrome camera uses a full-size operation mode, the color camera uses a binning operation mode, and K≥1, a processor, connected to the monochrome camera and the color camera, and configured to obtain a first image corresponding to the monochrome camera and a second image corresponding to the color camera, further configured to obtain high-frequency information according to the first image, further configured to obtain low-frequency information according to the second image, and further configured to fuse the first image and the second image according to the high-frequency information and the low-frequency information, to generate a composite image of the to-be-photographed scene.

In this embodiment of the present invention, a plurality of cameras may be installed on the terminal, including the monochrome camera and the color camera. During each photographing, the monochrome camera and the color camera simultaneously capture an image, so that a possibility of hand trembling between cameras or object motion in a scene is reduced, that is, the monochrome camera and the color camera remain relatively static. In an image capturing process, the monochrome camera uses the full-size operation mode, and the color camera uses the binning operation mode. The processor of the terminal may obtain the first image corresponding to the monochrome camera and the second image corresponding to the color camera, then extract the high-frequency information (such as full-resolution detail information) and the low-frequency information (such as brightness information and color information) of the to-be-photographed scene, and fuse the first image and the second image according to this information, to generate the composite image of the to-be-photographed scene, so as to obtain an image with a relatively high restoration degree. Quality of the composite image is better than that of any one frame of image photographed previously. The photographing method for a terminal in this embodiment of the present invention is particularly applicable to low illumination or a night scene, so as to improve image quality.

In this embodiment of the present invention, the first image corresponding to the monochrome camera (mono camera) is a monochrome image, and the second image corresponding to the color camera is a color image. The monochrome camera (also referred to as a monochromatic camera) has advantages such as high resolving power and low noise due to high light transmittance and use of a full-pixel sensor. Therefore, the full-resolution detail information (that is, the high-frequency information) of the to-be-photographed scene may be obtained by using the monochrome camera. The color camera may obtain the brightness information and the color information of the to-be-photographed scene, for example, the color camera may output Bayer format raw data, and the processor may obtain through parsing the color information of the image by using a demosaic algorithm or another image processing algorithm. A resolution of the first image is better than that of the second image herein.

In this embodiment of the present invention, the monochrome camera and the color camera are independent of each other, and are located on a same plane, and their corresponding optical axes are parallel. For example, the monochrome camera and the color camera may be disposed side by side in hardware design.

A value of K is not specifically limited in this embodiment of the present invention. The K frames of images may correspond to K times of photographing, for example, K may be 1, 2, 3, 4, or the like. A relationship between a quantity of continuously photographed images and a time interval required to photograph these images may be considered for selection of K. In other words, the terminal may photograph one time and separately capture one frame of image (such as the first image and the second image) by using the monochrome camera and the color camera. Alternatively, the terminal may photograph a plurality of times and separately capture a plurality of frames of images by using the monochrome camera and the color camera, and then perform multi-frame temporal noise reduction (a multi-frame temporal noise reduction method may be used, which will be described below) processing on the plurality of frames of images to obtain one frame of image (such as the first image) corresponding to the monochrome camera and one frame of image (such as the second image) corresponding to the color camera.

In some possible implementations, when fusing the first image and the second image, a specific processing procedure of the processor may include processing brightness of the first image based on the low-frequency information and by using the second image as a reference image, to obtain a third image, performing upsampling processing on the second image based on the high-frequency information, to obtain a fourth image, performing registration on the fourth image by using the third image as a reference image, to obtain a fifth image, and fusing the fifth image and the third image, to generate the composite image of the to-be-photographed scene.

The terminal may combine the high-frequency information and the low-frequency information and process the first image obtained by the monochrome camera and the second image obtained by the color camera, so as to obtain the composite image of the to-be-photographed scene, and improve quality of the photographed image.

In some possible implementations, when K≥2, the processor may perform temporal noise reduction processing on the plurality of frames of images, to obtain the first image corresponding to the monochrome camera and the second image corresponding to the color camera, which may specifically include obtaining K frames of images corresponding to the monochrome camera and K frames of images corresponding to the color camera, performing temporal noise reduction on the K frames of images corresponding to the monochrome camera, to obtain the first image, and performing temporal noise reduction on the K frames of images corresponding to the color camera, to obtain the second image.

Optionally, the performing temporal noise reduction on the K frames of images corresponding to the monochrome camera includes performing a global image registration operation on the K frames of images corresponding to the monochrome camera by using a global motion relationship corresponding to the color camera.

When performing the temporal noise reduction on the K frames of images of the monochrome camera herein, the processor may directly use the global motion relationship corresponding to the color camera to perform the global image registration operation on the K frames of images of the monochrome camera. This avoids recalculating a global motion relationship of the monochrome camera, and reduces a computation amount, so as to improve a processing speed.

In some possible implementations, the processor may further perform spatial noise reduction on the composite image of the to-be-photographed scene.

In this embodiment of the present invention, the processor performs spatial noise reduction on the composite image of the to-be-photographed scene, so as to further reduce noise, and obtain a clearer image.

According to a second aspect, a photographing method for a terminal is provided, where the terminal includes a monochrome camera and a color camera, and the method includes simultaneously photographing a same to-be-photographed scene by using the monochrome camera and the color camera, to separately obtain K frames of images, where the monochrome camera uses a full-size operation mode, the color camera uses a binning operation mode, and K≥1, obtaining a first image corresponding to the monochrome camera and a second image corresponding to the color camera, obtaining high-frequency information according to the first image, obtaining low-frequency information according to the second image, and fusing the first image and the second image according to the high-frequency information and the low-frequency information, to generate a composite image of the to-be-photographed scene.

In this embodiment of the present invention, the monochrome camera and the color camera are installed on the terminal. During each photographing, the monochrome camera and the color camera simultaneously capture an image, so that a possibility of hand trembling between cameras or object motion in a scene is reduced, that is, the monochrome camera and the color camera remain relatively static. In an image capturing process, the monochrome camera uses the full-size operation mode, and the color camera uses the binning operation mode. The terminal obtains the first image corresponding to the monochrome camera and the second image corresponding to the color camera according to the K times of photographing, then extracts the high-frequency information (such as full-resolution detail information) and the low-frequency information (such as brightness information and color information) of the to-be-photographed scene, and fuses the first image and the second image according to this information, to generate the composite image of the to-be-photographed scene. Quality of the composite image is better than that of any one frame of the K frames of images obtained through the K times of photographing. The photographing method for a terminal in this embodiment of the present invention is particularly applicable to low illumination or a night scene, so as to improve image quality.

Alternatively, in this embodiment of the present invention, the step "simultaneously photographing a same to-be-photographed scene by using the monochrome camera and the color camera, to separately obtain K frames of images" may also be understood as "performing K times of photographing on the same to-be-photographed scene by using the monochrome camera and the color camera, and simultaneously capturing, by the monochrome camera and the color camera, one frame of image separately during each photographing".

In some possible implementations, the fusing the first image and the second image according to the high-frequency information and the low-frequency information, to generate a composite image of the to-be-photographed scene includes processing brightness of the first image based on the low-frequency information and by using the second image as a reference image, to obtain a third image, performing upsampling processing on the second image based on the high-frequency information, to obtain a fourth image, performing registration on the fourth image by using the third image as a reference image, to obtain a fifth image, and fusing the fifth image and the third image, to generate the composite image of the to-be-photographed scene.

In some possible implementations, when K≥2, the obtaining a first image corresponding to the monochrome camera and a second image corresponding to the color camera includes obtaining K frames of images corresponding to the monochrome camera and K frames of images corresponding to the color camera, performing temporal noise reduction on the K frames of images corresponding to the monochrome camera, to obtain the first image, and performing temporal noise reduction on the K frames of images corresponding to the color camera, to obtain the second image.

Optionally, the performing temporal noise reduction on the K frames of images corresponding to the monochrome camera includes performing a global image registration operation on the K frames of images corresponding to the monochrome camera by using a global motion relationship corresponding to the color camera.

In some possible implementations, the method may further include performing spatial noise reduction on the composite image of the to-be-photographed scene.

According to a third aspect, a photographing method for a terminal is provided, where the terminal includes an infrared camera and a color camera, the method is similar to a photographing method for a terminal in the second aspect, the infrared camera can perform a corresponding solution of a monochrome camera, and a related solution of the color camera is the same as that in the second aspect. For brevity, details are not described herein again. In other words, the monochrome camera in the second aspect may be replaced with the infrared camera.

According to a fourth aspect, a terminal is provided, where the terminal is configured to perform the method in the second aspect or any possible implementation of the second aspect. Specifically, the apparatus includes a unit configured to perform the method in the second aspect or any possible implementation of the second aspect.

According to a fifth aspect, a terminal is provided, where the terminal is configured to perform the method in the third aspect or any possible implementation of the third aspect. Specifically, the apparatus includes a unit configured to perform the method in the third aspect or any possible implementation of the third aspect.

According to a sixth aspect, a computer-readable storage medium is provided, where the computer-readable storage medium stores a program, and the program enables a terminal to perform the photographing method for a terminal according to any one of the second aspect or the implementations of the second aspect.

According to a seventh aspect, a computer-readable storage medium is provided, where the computer-readable storage medium stores a program, and the program enables a terminal to perform the photographing method for a terminal according to any one of the third aspect or the implementations of the third aspect.

DETAILED DESCRIPTION OF ILLUSTRATIVE EMBODIMENTS

The following describes the technical solutions in the embodiments of the present invention with reference to the accompanying drawings in the embodiments of the present invention.

The technical solutions in the embodiments of the present invention may be applied to a terminal. The terminal may be but is not limited to a mobile station (MS), a mobile terminal, a mobile phone, a handset, a portable device (portable equipment), and the like, and may communicate with one or more core networks by using a radio access network (RAN). The terminal may be a mobile terminal such as a mobile phone (or referred to as a "cellular" phone) or a computer having a mobile terminal, for example, may be a portable, pocket-sized, handheld, computer built-in, or in-vehicle mobile terminal, and exchange language and/or data with the radio access network. Alternatively, the terminal may be various products having a touchscreen, for example, a tablet computer, a touchscreen phone, a touchscreen device, and a mobile phone terminal, which is not limited herein. Further, the terminal may be a device having a photographing function, for example, a mobile phone having a camera, a tablet computer, or another device having a photographing function.

Some related concepts or terms used in the embodiments of the present invention are described herein.

Figures 1A, 1B:
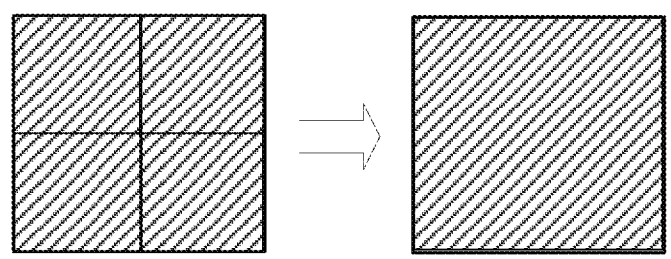
FIG. 1A is a schematic diagram of an example of a binning mode.
FIG. 1B is a structural diagram of a Bayer color filter array.

A binning mode is an image read manner, that is, induced charges in adjacent pixels of an image sensor are added together, and are read in one-pixel mode. In the binning mode, a charge in a vertical direction and/or a horizontal direction may be processed. In the vertical direction, charges of adjacent columns are added together for read, and in the horizontal direction, pixel induced charges of adjacent lines are added together for read. In other words, in the binning mode, N adjacent pixel values of an image are superimposed and output as one pixel value. For example, FIG. 1A shows a schematic diagram of an example of the binning mode. In FIG. 1A, each  in the left figure represents one pixel. The binning mode means that four pixels  in the left figure of FIG. 1A are combined as one pixel  for use. It should be understood that four pixels are merely used as an example for description herein, and constitute no limitation on the present invention.

Photographing in the binning mode can increase a light-sensitive area and improve light sensitivity in a low light environment. Therefore, the binning mode is particularly applicable to a low illumination photographing environment. In other words, the binning mode does not reduce a quantity of pixels involved in imaging and therefore does not reduce the light sensitivity.

In addition, the binning mode reduces a resolution of the image, that is, the binning mode improves the light sensitivity and an output rate of the image at the cost of the resolution of the image.

Currently, most cameras use a Bayer template image sensor. Correspondingly, an image obtained by a camera is a Bayer format image. FIG. 1B shows a structural diagram of a Bayer color filter array. Light with one color of red (R), green (G), and blue (B) is allowed to permeate in each pixel position.

To truly reproduce a photographing scene, color values of three color channels need to be collected in each pixel position. A color camera obtains color information of the image by using a color filter array (CFA), that is, the color filter array allows only a light component with one color of R, G, or B to permeate the camera in each pixel position (which, for example, is implemented by using a light filter), so that each image pixel captured by the color camera has only one color component. Therefore, to display a color image of all the three RGB color components, components of two other colors need to be obtained through area estimation, and such a process is referred to as CFA interpolation. In addition, currently, a commonly used interpolation algorithm includes a bilinear interpolation algorithm, an edge detection algorithm, or a demosaic algorithm, and color restoration may be performed on the image by using these interpolation algorithms.

In addition, because a monochrome camera does not need to filter a color by using the light filter, a resolution of a monochrome image obtained by the monochrome camera is better than that of the color image obtained by the color camera.

Figure 1C:
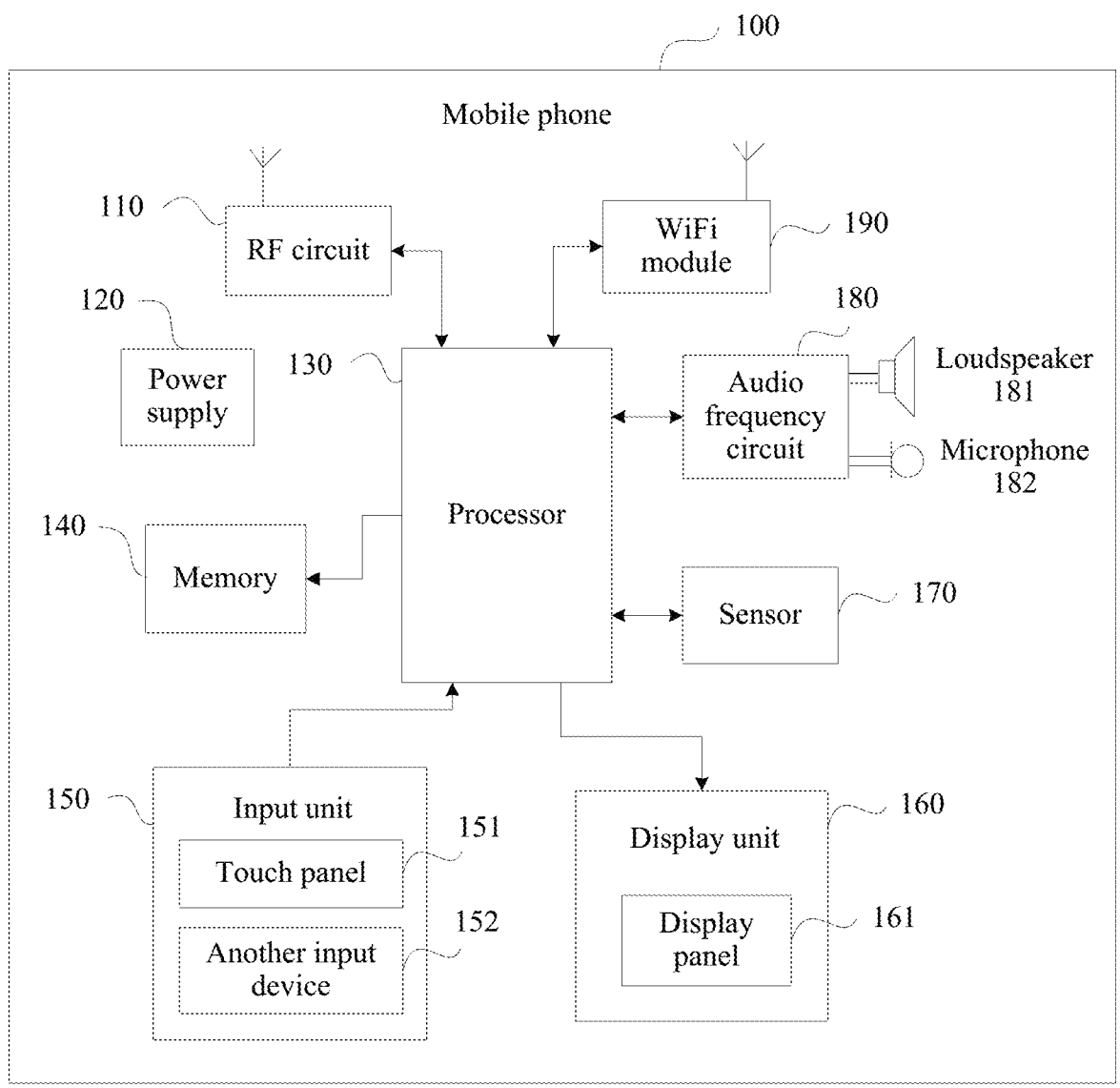
FIG. 1C is a block diagram of a partial structure of a mobile phone related to an embodiment of the present invention.

The following uses an example in which the terminal is the mobile phone. FIG. 1C shows a block diagram of a partial structure of a mobile phone 100 related to an embodiment of the present invention. As shown in FIG. 1C, the mobile phone 100 may include components such as a radio frequency (RF) circuit 110, a power supply 120, a processor 130, a memory 140, an input unit 150, a display unit 160, a sensor 170, an audio frequency circuit 180, and a Wireless Fidelity (WiFi) module 190. It should be understood that, the structure of the mobile phone shown in FIG. 1 constitutes no limitation on the mobile phone, and the mobile phone may include components more or fewer than those shown in the figure, or a combination of some components, or different component arrangements.

The following specifically describes each component of the mobile phone 100 with reference to FIG. 1C.

The RF circuit 110 may be configured to receive and send a signal in an information receiving or sending process or a call process, and particularly, after receiving downlink information of a base station, send the downlink information to the processor 130 for processing, and in addition, send related uplink data to the base station. Generally, the RF circuit includes but is not limited to an antenna, at least one amplifier, a transceiver, a coupler, a low noise amplifier (LNA), a duplexer, and the like. In addition, the RF circuit 110 may further communicate with a network and another device through wireless communication. Any communications standard or protocol may be used for the wireless communication, including but not limited to a Global System for Mobile Communications (GSM), a general packet radio service (GPRS), Code Division Multiple Access (CDMA), Wideband Code Division Multiple Access (WCDMA), Long Term Evolution (LTE), an email, a short message service (SMS), and the like.

The memory 140 may be configured to store a software program and a module. The processor 130 performs various functional applications of the mobile phone 100 and data processing by running the software program and the module stored in the memory 140. The memory 140 may mainly include a program storage area and a data storage area. The program storage area may store an operating system, an application program required by at least one function (such as a voice play function or an image play function), and the like. The data storage area may store data (such as audio data or a phone book) created according to use of the mobile phone 100, and the like. In addition, the memory 140 may include a high-speed random access memory, or may include a nonvolatile memory, for example, at least one magnetic disk storage device, a flash memory device, or another volatile solid-state storage device.

The input unit 150 may be configured to receive input digit or character information, and generate key signal input related to a user setting and function control of the mobile phone 100. Specifically, the input unit 150 may include a touch panel 151 and another input device 152. The touch panel 151, also referred to as a touchscreen, can collect a touch operation (for example, an operation of a user on the touch panel 151 or near the touch panel 151 by using any proper object or accessory such as a finger or a stylus) of the user on or near the touch panel 51, and drive a corresponding connected apparatus according to a preset program. Optionally, the touch panel 151 may include two parts, including a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into touch point coordinates, and sends the touch point coordinates to the processor 130, and can receive and execute a command sent by the processor 130. In addition, the touch panel 151 may be implemented by using a plurality of types such as a resistive type, a capacitive type, an infrared ray, and a surface acoustic wave. In addition to the touch panel 151, the input unit 150 may further include the another input device 152. Specifically, the another input device 152 may include but is not limited to one or more of a physical keyboard, a function key (such as a volume control key or an on/off key), a trackball, a mouse, a joystick, or the like.

The display unit 160 may be configured to display information input by the user or information provided for the user and various menus of the mobile phone 100. The display unit 160 may include a display panel 161. Optionally, the display panel 161 may be configured in a form of an LCD, an OLED, or the like. Further, the touch panel 151 may cover the display panel 161. When detecting the touch operation on or near the touch panel 151, the touch panel 151 transmits the touch operation to the processor 130 to determine a type of a touch event, and then the processor 130 provides corresponding visual output on the display panel 161 according to the type of the touch event. Although the touch panel 151 and the display panel 151 in FIG. 1 are used as two independent components to implement input and input functions of the mobile phone 100, in some embodiments, the touch panel 151 and the display panel 161 may be integrated to implement the input and output functions of the mobile phone 100.

The mobile phone 100 may further include at least one sensor 170, for example, a light sensor, a motion sensor, and another sensor. Specifically, the light sensor may include an ambient light sensor and a proximity sensor. The ambient light sensor may adjust luminance of the display panel 161 according to brightness or dimness of ambient light. The proximity sensor may turn off the display panel 161 and/or backlight when the mobile phone 100 moves to an ear. As one type of the motion sensor, an accelerometer sensor may detect an acceleration value in each direction (generally, there are three axes), may detect a value and a direction of gravity in a static state, and may be configured to identify mobile phone posture application (such as switch between landscape and portrait screens, a related game, and magnetometer posture calibration), and a vibration-recognition related function (such as a pedometer and a stroke), and the like. A gyroscope, a barometer, a hygrometer, a thermometer, an infrared sensor, and another sensor may be further configured on the mobile phone 100, and details are not described herein.

The audio frequency circuit 180, a loudspeaker 181, and a microphone 182 may provide audio interfaces between the user and the mobile phone 100. The audio frequency circuit 180 may transmit, to the loudspeaker 181, an electrical signal converted from received audio data, and the loudspeaker 181 converts the electrical signal into a sound signal for output. On the other hand, the microphone 182 converts a collected sound signal into an electrical signal, and the audio frequency circuit 180 receives the electrical signal, converts the electrical signal into audio data, and outputs the audio data to the RF circuit 110 to send the audio data to, for example, another mobile phone, or outputs the audio data to the memory 140 for further processing.

WiFi is a short-distance wireless transmission technology. The mobile phone 100 may help, by using the WiFi module 190, the user receive and send an email, browse a web page, access streaming media, and so on. The WiFi module 190 provides the user with wireless broadband Internet access. Although FIG. 1C shows the WiFi module 190, it may be understood that the WiFi module 190 is not a mandatory part of the mobile phone 100, and may be omitted according to a need without changing the essence of the present invention.

The processor 130 is a control center of the mobile phone 100, connects all parts of the entire mobile phone by using various interfaces and lines, and performs various functions of the mobile phone 100 and data processing by running or executing the software program and/or the module that are/is stored in the memory 140 and by invoking data stored in the memory 140, so as to implement a plurality of services that are based on the mobile phone. Optionally, the processor 130 may include one or more processing units. Preferably, an application processor and a modem processor may be integrated into the processor 130. The application processor mainly processes an operating system, a user interface, an application program, and the like. The modem processor mainly processes wireless communication. It may be understood that the modem processor may not be integrated into the processor 130.

The mobile phone 100 further includes the power supply 120 (such as a battery) that supplies power to the parts. Preferably, the power supply may be logically connected to the processor 130 by using a power supply management system, so that functions such as charging, discharging, and power consumption management are implemented by using the power supply management system.

The mobile phone 100 may further include a camera, a Bluetooth module, and the like, which are not shown though.

Figure 1D:
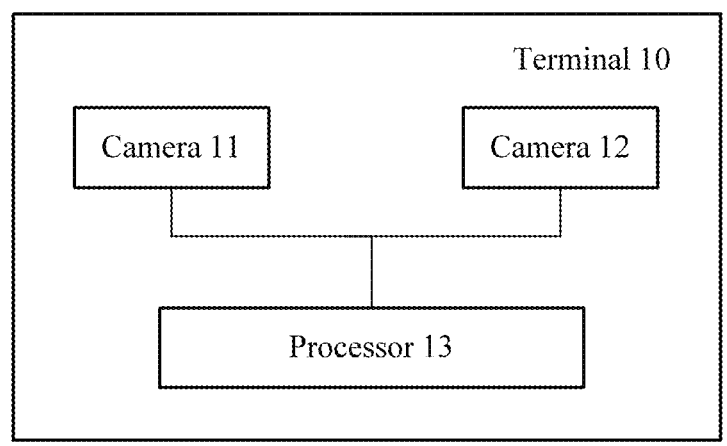
FIG. 1D is a schematic block diagram of a terminal according to an embodiment of the present invention.

FIG. 1D is a schematic block diagram of a terminal according to an embodiment of the present invention. The terminal 10 includes a camera 11 (for example, the camera 11 is a monochrome camera) and a camera 12 (for example, the camera 12 is a color camera), and a processor 13 (for example, the processor 130 in FIG. 1C). Optionally, the terminal 10 may further include a part or all of the structure of the mobile phone 100 shown in FIG. 1C, and a function of the structure is not described herein again. The following describes an example in which the camera 11 is the monochrome camera and the camera 12 is the color camera.

The monochrome camera 11 and the color camera 12 are configured to simultaneously photograph a same to-be-photographed scene, to separately obtain K frames of images, where the monochrome camera uses a full-size operation mode, the color camera uses a binning operation mode, and K≥1.

The processor 13 is connected to the monochrome camera 11 and the color camera 12, and is configured to obtain a first image corresponding to the monochrome camera and a second image corresponding to the color camera, further configured to obtain high-frequency information according to the first image, further configured to obtain low-frequency information according to the second image, and further configured to fuse the first image and the second image according to the high-frequency information and the low-frequency information, to generate a composite image of the to-be-photographed scene.

In this embodiment of the present invention, a plurality of cameras may be installed on the terminal, including the monochrome camera and the color camera. During each photographing, the monochrome camera and the color camera simultaneously capture an image, so that a possibility of hand trembling between cameras or object motion in a scene is reduced, that is, the monochrome camera and the color camera remain relatively static.

In an image capturing process, the monochrome camera uses the full-size (full size) operation mode, so as to obtain the high-frequency information of the to-be-photographed scene. The color camera uses the binning (binning) operation mode and combines N adjacent pixels (pixel) of the image into one pixel to perform photographing with relatively high sensitivity, so as to obtain the low-frequency information of the to-be-photographed scene.

The processor 13 of the terminal may separately obtain the K frames of images according to K times of photographing, obtain the first image corresponding to the monochrome camera according to K frames of monochrome images corresponding to the monochrome camera, and obtain the second image corresponding to the color camera according to K frames of color images corresponding to the color camera. Then, the processor 13 extracts the high-frequency information (such as full-resolution detail information, that is, a detail of the image) and the low-frequency information (such as brightness information and color information) of the to-be-photographed scene, fuses the first image and the second image according to this information, to generate the composite image of the to-be-photographed scene, so as to obtain an image with a relatively high restoration degree. Quality of the composite image is better than that of any one frame of the K frames of images obtained through the K times of photographing. A photographing method for a terminal in this embodiment of the present invention is particularly applicable to low illumination or a night scene, so as to improve image quality.

To highlight a technical effect of this application, the following compares the solutions of this application with some technical solutions in the prior art. Currently, to improve photographing quality of low illumination or a night scene, there are mainly the following solutions.

1. The photographing quality of the low illumination or the night scene is improved by performing brightness enhancement processing on an image, for example, a brightness enhancement method based on image histogram distribution, and a brightness enhancement method based on depth learning. Because a signal-to-noise ratio of the image under a low illumination condition is extremely low, such a singular brightness enhancement method brings disadvantages such as great noise and color cast. However, a method in this application does not cause the noise and/or the color cast, and picture detail information, brightness information, and color information of an image that is obtained by using the method in this application are improved.

2. The photographing quality of the low illumination or the night scene is improved by increasing a digital gain value during photographing, for example, increasing International Organization for Standardization (ISO) light sensitivity or exposure. A photographing signal is weak under the low illumination condition. Therefore, a dark current of a circuit occupies a main component, black level correction (BLC) of a camera is not quite accurate, and drift easily occurs. In addition, accuracy of automatic white balance (AWB) of the camera is not high, generally, fuchsia appears and is particularly serious in four corners of an image, and the color information of the image is lost, that is, quality of the image obtained by increasing the digital gain value is not good. However, the photographing method in this application does not cause these problems, and the picture detail information, the brightness information, and the color information of the image that is obtained by using the method in this application are improved.

3. The photographing quality of the low illumination or the night scene is improved by increasing an exposure time. Increasing the exposure time causes a problem of motion blur, and therefore it is extremely inconvenient for a user who takes a photo anytime anywhere. However, in the solutions of this application, the user can conveniently perform photographing anytime anywhere, and the picture detail information, the brightness information, and the color information of the obtained photographed image are improved.

4. A singular binning technology loses high-frequency information of the image, that is, image detail information. However, according to the photographing method in this application, the high-frequency information and the low-frequency information of the image can be obtained, that is, the picture detail information, the brightness information, and the color information of the finally obtained photographed image are improved.

In conclusion, compared with the existing solutions, an image of better quality can be obtained in the photographing method for a terminal in this application.

In this embodiment of the present invention, the first image corresponding to the monochrome camera is a monochrome image, and the second image corresponding to the color camera is a color image. The monochrome camera (also referred to as a monochromatic camera) has advantages such as high resolving power and low noise due to high light transmittance and use of a full-pixel sensor. Therefore, the full-resolution detail information (that is, the high-frequency information) of the to-be-photographed scene may be obtained by using the monochrome camera. The color camera may obtain the brightness information and the color information of the to-be-photographed scene, for example, the color camera may output Bayer format raw data, and the processor 13 may obtain through parsing the color information of the image by using a demosaic algorithm or another image processing algorithm. A resolution of the first image is better than that of the second image herein.

Optionally, in some scenarios, the monochrome camera may also be replaced with the monochromatic camera, for example, an infrared camera, so as to photograph a dark environment or the night scene. In other words, the monochrome camera in this application may be replaced with the infrared camera, and a corresponding operation is performed. To avoid repetition, details are not described herein again.

In this embodiment of the present invention, the monochrome camera and the color camera are independent of each other, and are located on a same plane, and their corresponding optical axes are parallel. For example, the monochrome camera and the color camera may be disposed side by side in hardware design.

It should be understood that a value of K is not specifically limited in this embodiment of the present invention. The K frames of images may be obtained through the K times of photographing, for example, K may be 1, 2, 3, 4, or the like. A relationship between a quantity of continuously photographed images and a time interval required to photograph these images may be considered for selection of K. In other words, the terminal may photograph one time and separately capture one frame of image (such as the first image and the second image) by using the monochrome camera and the color camera. Alternatively, the terminal may photograph a plurality of times and separately capture a plurality of frames of images by using the monochrome camera and the color camera, and then perform multi-frame temporal noise reduction (a multi-frame temporal noise reduction method may be used, which will be described below) processing on the plurality of frames of images to obtain one frame of image (such as the first image) corresponding to the monochrome camera and one frame of image (such as the second image) corresponding to the color camera.

In practice, in consideration of comprehensive performance of a photographing speed and a photographing effect, for example, K may be set to 4, and for the first image, corresponding four frames of monochrome full-size mono full size images (for example, the resolution is 12 M) are obtained, and for the second image, corresponding four frames of color binning color binning images (for example, the resolution is 3 M) are obtained.

It should be further understood that a value of a camera is not specifically limited in this embodiment of the present invention. For example, there may also be more cameras in addition to the monochrome camera and the color camera. Specifically, a relationship between a quantity of cameras and terminal costs may be considered for selection of the quantity of cameras. A larger quantity of cameras indicates higher corresponding terminal costs and a shorter time interval at which the plurality of frames of images are photographed.

In this embodiment of the present invention, the processor 13 may be an image signal processing (ISP) apparatus, or may be a central processing unit (CPU), or may not only include the ISP apparatus, but also include the CPU, that is, a function of the foregoing processor may be jointly completed by the ISP apparatus and the CPU. The processor 13 can control the camera to capture the image.

Therefore, the terminal simultaneously photographs the same to-be-photographed scene by using the monochrome camera and the color camera, to separately obtain the K frames of images, where the monochrome camera uses the full-size operation mode, and the color camera uses the binning operation mode. The terminal obtains the first image corresponding to the monochrome camera and the second image corresponding to the color camera, obtains the high-frequency information according to the first image, then obtains the low-frequency information according to the second image, and finally fuses the first image and the second image according to the high-frequency information and the low-frequency information, to generate the composite image of the to-be-photographed scene, so as to improve the image quality.

Optionally, in an embodiment, when fusing the first image and the second image, a specific processing procedure of the processor 13 may include processing brightness of the first image based on the low-frequency information and by using the second image as a reference image, to obtain a third image, performing upsampling processing on the second image based on the high-frequency information, to obtain a fourth image, performing registration on the fourth image by using the third image as a reference image, to obtain a fifth image, and fusing the fifth image and the third image, to generate the composite image of the to-be-photographed scene.

An example in which the first image is the monochrome image, and the second image is the color image is used for description.

First, the processor 13 performs histogram matching on the first image (mono full size image) based on the low-frequency information (mainly the brightness information) and by using a histogram of the second image (color binning image) as a reference, to obtain the third image that is the same as or equivalent to the second image in terms of global brightness.

The second image (that is, the color image) is obtained by the color camera in the binning mode herein. The binning mode does not reduce a quantity of pixels involved in imaging and therefore does not reduce light sensitivity. Therefore, brightness processing (specifically, that is, increasing the brightness of the monochrome image) is performed on the first image (that is, the monochrome image), so as to obtain an image having an identical or equivalent brightness level as the color image.

Then, the processor 13 performs the upsampling processing on the second image based on the high-frequency information, to obtain the fourth image having an identical or equivalent resolution as the first image. An upsampling method is not specifically limited. Optionally, in the upsampling method, a sampling algorithm such as an existing bilinear interpolation algorithm or a bicubic interpolation algorithm may be used.

Then, the processor 13 performs the registration on the fourth image by using the third image as the reference image, to obtain the fifth image. Optionally, the registration is performed on the fourth image by using a combination of a global registration algorithm (Speed Up Robust Feature, SURF) based on feature point matching (for example, matching is performed according to a feature point of the third image and a feature point of the fourth image, an affine transformation relationship between the third image and the fourth image is obtained with reference to a least square method or another method, and transformation is performed on the fourth image to obtain the registered image) and a local registration algorithm based on block match (BM) (for example, the block match is performed according to a subblock of the third image and a subblock of the fourth image, and transformation is performed on the fourth image to obtain the registered image). For example, transformation is performed on the fourth image by using the third image as the reference image, to obtain an image that matches the third image, that is, the fifth image.

Finally, the processor 13 fuses the fifth image and the third image, specifically, that is, combines the color information of the fifth image with the brightness information of the third image to output one frame of a new color image, that is, the composite image of the to-be-photographed scene.

Therefore, the terminal may combine the high-frequency information and the low-frequency information of the to-be-photographed scene and process the first image obtained by the monochrome camera and the second image obtained by the color camera, so as to obtain the composite image of the to-be-photographed scene, and improve quality of the photographed image.

It should be understood that in this embodiment of the present invention, a number "first", "second", or the like is introduced merely for distinguishing different objects, for example, distinguishing different images, or distinguishing different cameras, and constitutes no limitation on the present invention.

Optionally, in an embodiment, when K≥2, the processor 13 may perform temporal noise reduction processing on the plurality of frames of images, to obtain the first image corresponding to the monochrome camera and the second image corresponding to the color camera, which may specifically include obtaining K frames of images corresponding to the monochrome camera and K frames of images corresponding to the color camera according to the K times of photographing, performing temporal noise reduction on the K frames of images corresponding to the monochrome camera, to obtain the first image, and performing temporal noise reduction on the K frames of images corresponding to the color camera, to obtain the second image.

Specifically, when there are a plurality of times of photographing, the terminal may capture the plurality of frames of images, for example, a plurality of frames of images corresponding to the monochrome camera, and a plurality of frames of images corresponding to the color camera. In this case, the processor 13 may separately perform the temporal noise reduction processing on the captured plurality of frames of images, so as to obtain the first image and the second image, and perform a subsequent operation. For an algorithm for the temporal noise reduction, refer to an operation in the prior art herein, including global image registration, local ghost detection, and temporal fusion.

Optionally, the performing temporal noise reduction on the K frames of images corresponding to the monochrome camera includes performing a global image registration operation on the K frames of images corresponding to the monochrome camera by using a global motion relationship corresponding to the color camera.

Specifically, when performing the temporal noise reduction on the K frames of images of the monochrome camera, the processor 13 may directly use the global motion relationship corresponding to the color camera to perform the global image registration operation on the K frames of images of the monochrome camera. This avoids recalculating a global motion relationship of the monochrome camera, and reduces a computation amount, so as to improve a processing speed.

Because a computation amount involved in calculating the global motion relationship is relatively large, for example, calculating a homography matrix or another matrix used to describe a camera motion relationship, the monochrome camera and the color camera synchronously capture the image, and a relative motion relationship between the monochrome camera and the color camera is the same. Therefore, when performing image registration on the monochrome camera, the processor 13 directly uses the global motion relationship of the color camera to improve the processing speed.

Optionally, in an embodiment, the processor 13 may further perform spatial noise reduction on the composite image of the to-be-photographed scene.

In this embodiment of the present invention, the processor 13 performs spatial noise reduction on the composite image of the to-be-photographed scene, so as to further reduce noise, and obtain a clearer image. "The spatial noise reduction" herein may also be understood as "spatial filtering", and a method in the prior art may be used to perform the spatial noise reduction on the composite image, for example, a non-local means (Non-local means) algorithm, a classic bilateral filter in the industry, or another noise reduction algorithm.

The following describes a photographing method for a terminal in an embodiment of the present invention in more detail with reference to a specific example. It should be noted that the example in FIG. 2 is merely intended to help a person skilled in the art understand the embodiment of the present invention, instead of restricting the embodiment of the present invention to a specific numerical value or a specific scenario shown in the example.

Figure 2:
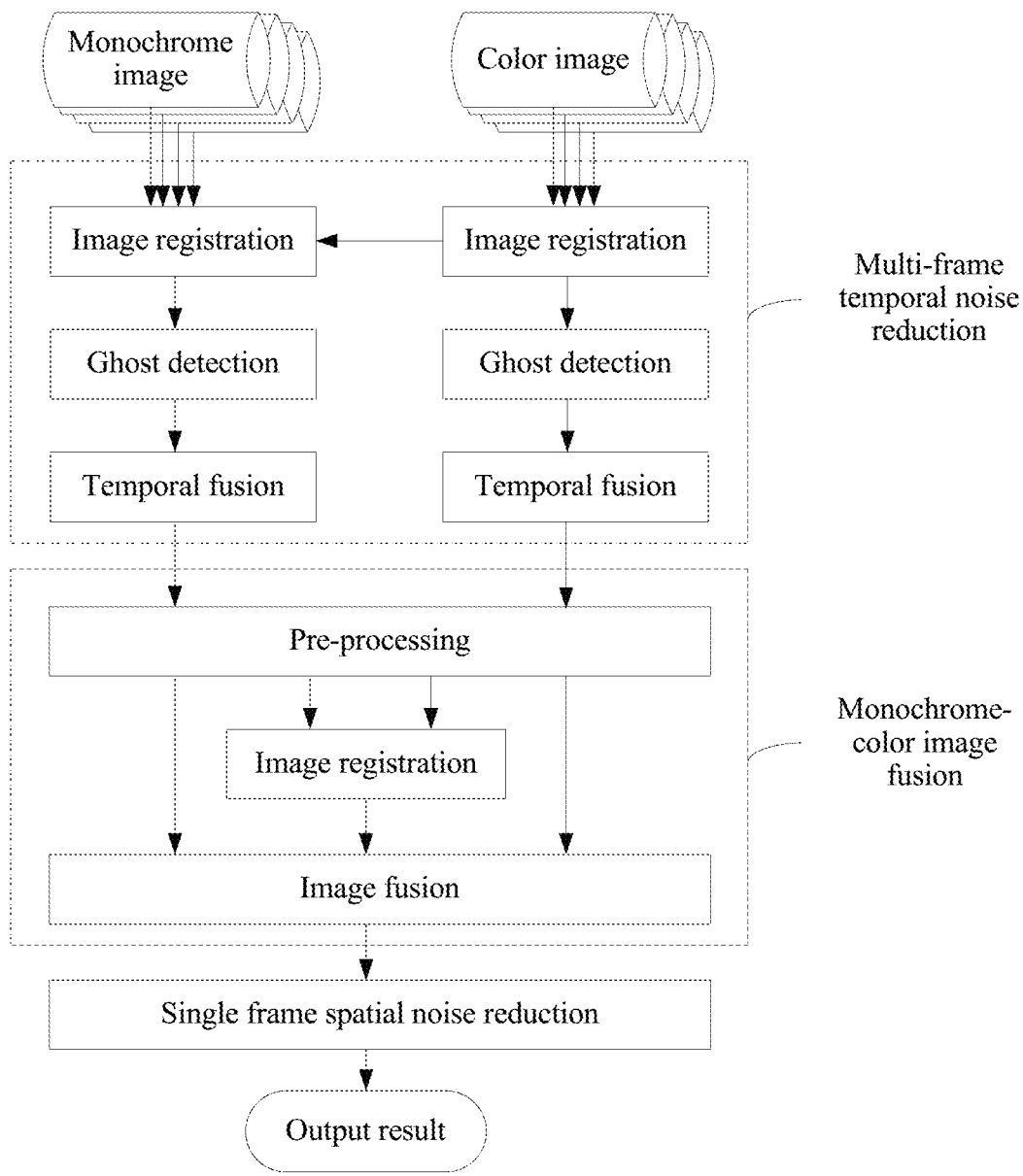
FIG. 2 is a schematic flowchart of a photographing method for a terminal according to an embodiment of the present invention.

FIG. 2 is a schematic flowchart of a photographing method for a terminal according to an embodiment of the present invention. The terminal to installs one monochrome camera (corresponding to the camera 11) and one color camera (corresponding to the camera 12) on a same plane, and performs four consecutive times of photographing in total, to obtain four frames of monochrome images and four frames of color images. The monochrome camera uses a full-size operation mode, and the color camera uses a binning operation mode.

First, the four frames of monochrome images (for example, a resolution is 12 M) and the four frames of color images (for example, a resolution is 3 M, which corresponds to ¼ of the resolution of a monochrome image).

Then, multi-frame temporal noise reduction (Multi-frame temporal denoise) is separately performed on the four frames of monochrome images and the four frames of color images, and may specifically include an image registration operation, a local ghost detection operation, and a multi-frame temporal fusion operation. When an image registration operation is performed on the monochrome image, a global motion relationship of a color image may be used.

The four frames of color images are used as an example herein (also applicable to the four frames of monochrome images), and processing such as image registration, ghost removal, and temporal fusion is performed on the four frames of color images to obtain one frame of color image (the resolution is 3 M). For example, motion compensation and registration are first performed on the four frames of color images by using a camera jitter model. Alternatively, motion compensation and registration may be performed based on SURF feature point matching and a homography matrix. Then, when a motion scene is photographed, the ghost removal may be performed on the four frames of color images, for example, a moving object may be detected and removed between the images. For details, refer to an existing ghost removal algorithm. When a stationary scene is photographed, the ghost removal may not be performed. Optionally, temporal noise reduction or spatial filtering is performed on the four frames of color images obtained after the ghost removal, for example, pixel values of all pixels of the four frames of color images may be averaged, or an infinite impulse response (IIR) filter is used for filtering. Finally, the temporal fusion is performed on the four frames of color images to obtain the one frame of color image.

Next, image fusion is performed on one frame of monochrome image and the one frame of color image (Color-Mono Fusion). This process may include an operation such as image pre-processing, image registration (Image Alignment), and image fusion.

For ease of description of an image fusion process (the following steps a to c), the one frame of monochrome image is denoted as "an image M", and the one frame of color image is denoted as "an image C" in the following.

a. The image pre-processing includes (1) brightness registration, because brightness of the image C and brightness of the image M are different (the brightness of the image C is better than that of the image M), to ensure that a final result image reaches a brightness level of the image C, for example, histogram matching is performed on the image M by using a histogram of the image C as a reference, so as to obtain an image M1 that is equivalent to the image C in terms of global brightness, (2) image size transformation, because a resolution of the image M and a resolution of the image C are different (the resolution of the image M is better than that of the image C), to ensures that a final result image reaches a resolution level of the image M, for example, sampling processing (such as a bilinear interpolation algorithm or a bicubic interpolation algorithm) is performed on the image C (the resolution is 3 M), so as to obtain an image C1 having an identical or equivalent resolution as the image M (a resolution is 12 M).

b. Perform image registration on the image C1 and the image M1, including transforming the image C1 by using the image M1 as a reference image, to obtain an image C2 that matches the image M1. Optionally, image registration may be performed in a form of a combination of global registration algorithm (SUBF global registration) based on feature point matching and a local registration algorithm based on block match (Block Match local registration).

c. Fuse the image M1 and the image C2, including fusing color information of the image C2 and brightness information of the image M1, to output one frame of color image F, that is, a final composite image of a to-be-photographed scene.

Finally, spatial noise reduction (single frame spatial denoise) is performed on the composite image.

To further reduce noise herein, spatial noise reduction or spatial filtering may be performed on the composite image (that is, the image F), so as to obtain a final output result. For spatial filtering, a filtering manner such as a classic bilateral filter or non-local means filter in the industry may be used.

It should be understood that in a specific implementation, an algorithm corresponding to the foregoing example may be implemented in a software manner (for example), or by integrating a functional module corresponding to each step into an ISP chip, and this is not limited in the present invention. Each step corresponds to a corresponding module, which may be, for example, an image capturing module, a multi-frame temporal noise reduction module, a monochrome-color image fusion module, or a spatial noise reduction module. Certainly, modules enumerated herein are merely an example for description, and this application is not necessarily limited to enumerated specific modules. Apparently, various equivalent modifications or changes may be performed.

Optionally, to improve a computation speed, in the foregoing example, the terminal may also directly obtain one frame of color image and one frame of monochrome image. In this case, the foregoing step of "multi-frame temporal noise reduction" may be ignored, and monochrome-color image fusion is directly performed.

According to the photographing method for a terminal in this embodiment of the present invention, an algorithm corresponding to the method may be implemented by using an emulation platform, for example, a programming emulation implementation algorithm may be performed in a VC 6.0 (that is, a Microsoft Visual C++ 6.0) environment, a Matlab environment, or an open source computer vision library (Open Source Computer Vision Library, open cv), and this is not limited in the present invention.

Figure 3:
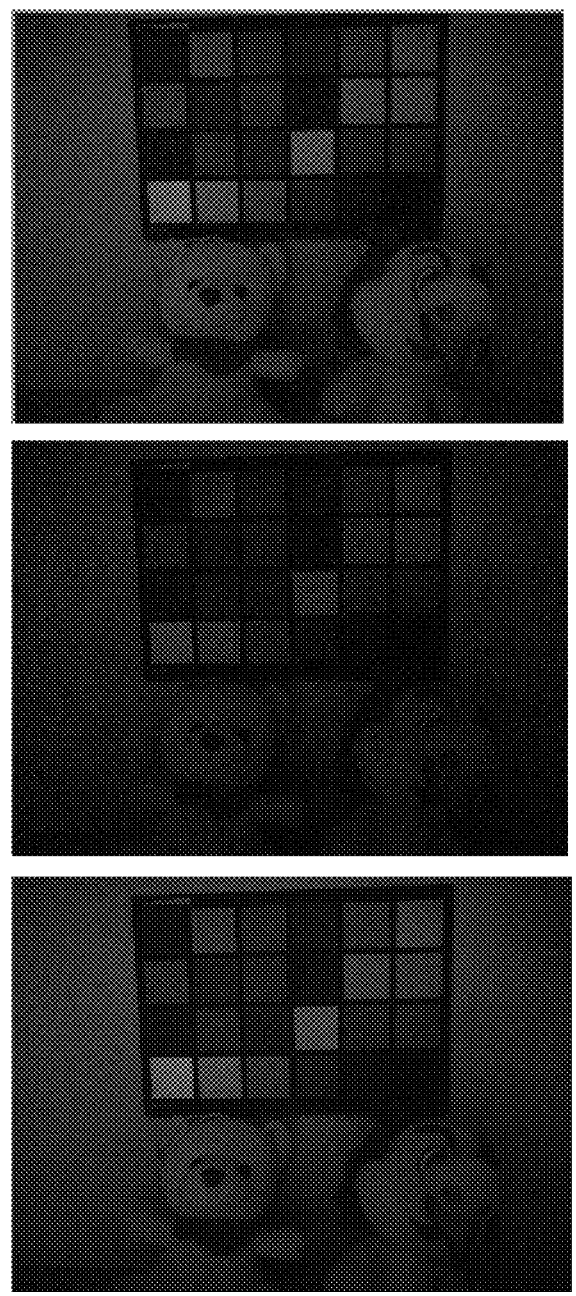
FIG. 3 is an effect comparison diagram of an example applied to an embodiment of the present invention.
Figure 4:
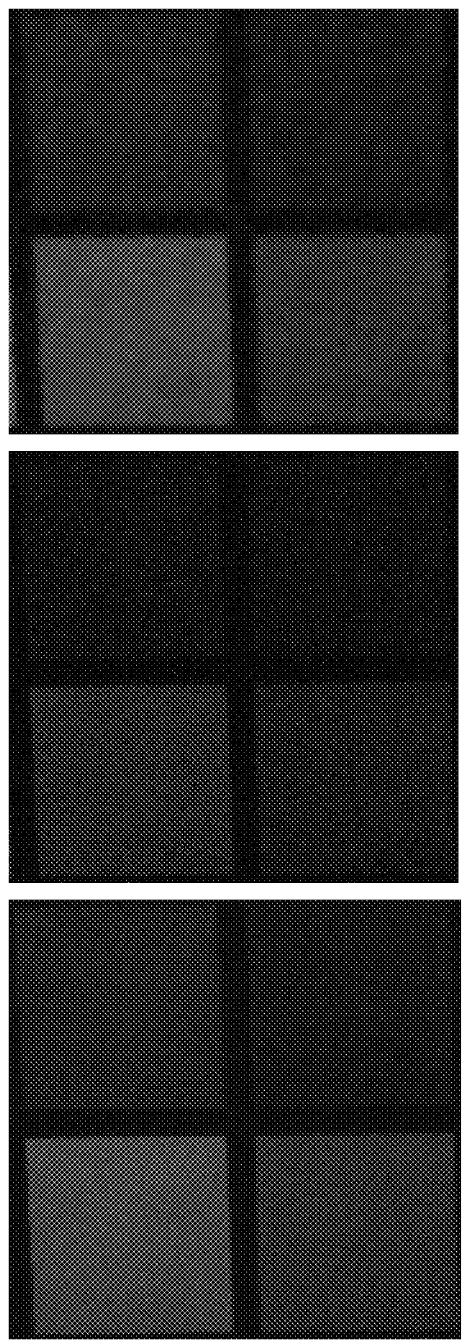
FIG. 4 is a local effect comparison diagram of an example applied to an embodiment of the present invention.

The following describes an emulation result of the photographing method for a terminal in this example with reference to FIG. 3 and FIG. 4. It should be noted that this is merely intended to help a person skilled in the art better understand this embodiment of the present invention, but is not intended to limit the scope of this embodiment of the present invention.

FIG. 3 is an effect comparison diagram of an original image (located in the upper part and the central part of FIG. 3) captured in a low illumination environment and a composite image obtained by using the solutions of this application (located in the lower part of FIG. 3). The original image includes one frame of color image (located in the upper part of FIG. 3) and one frame of monochrome image (located in the central part of FIG. 3). It can be seen from FIG. 3 that quality of the composite image obtained by using this embodiment of the present invention is obviously greatly improved, and the composite image combines high-frequency information (full-resolution detail information) of the monochrome image and low-frequency information (brightness information and color information) of the color image.

In addition, FIG. 4 is a partial effect comparison diagram of an example applied to an embodiment of the present invention. FIG. 4 shows a partially enlarged diagram in FIG. 3. An effect comparison diagram of an original image (located in the upper part and the central part of FIG. 4) and a composite image (located in the lower part of FIG. 4) obtained by applying the solutions of this application can be seen more clearly. The original image includes corresponding one frame of color image (located in the upper part of FIG. 4) and one frame of monochrome image (located in the central part of FIG. 4).

Therefore, the photographing method for a terminal in this embodiment of the present invention is of great significance for improving a photographing effect in a low illumination scenario.

Figure 5:
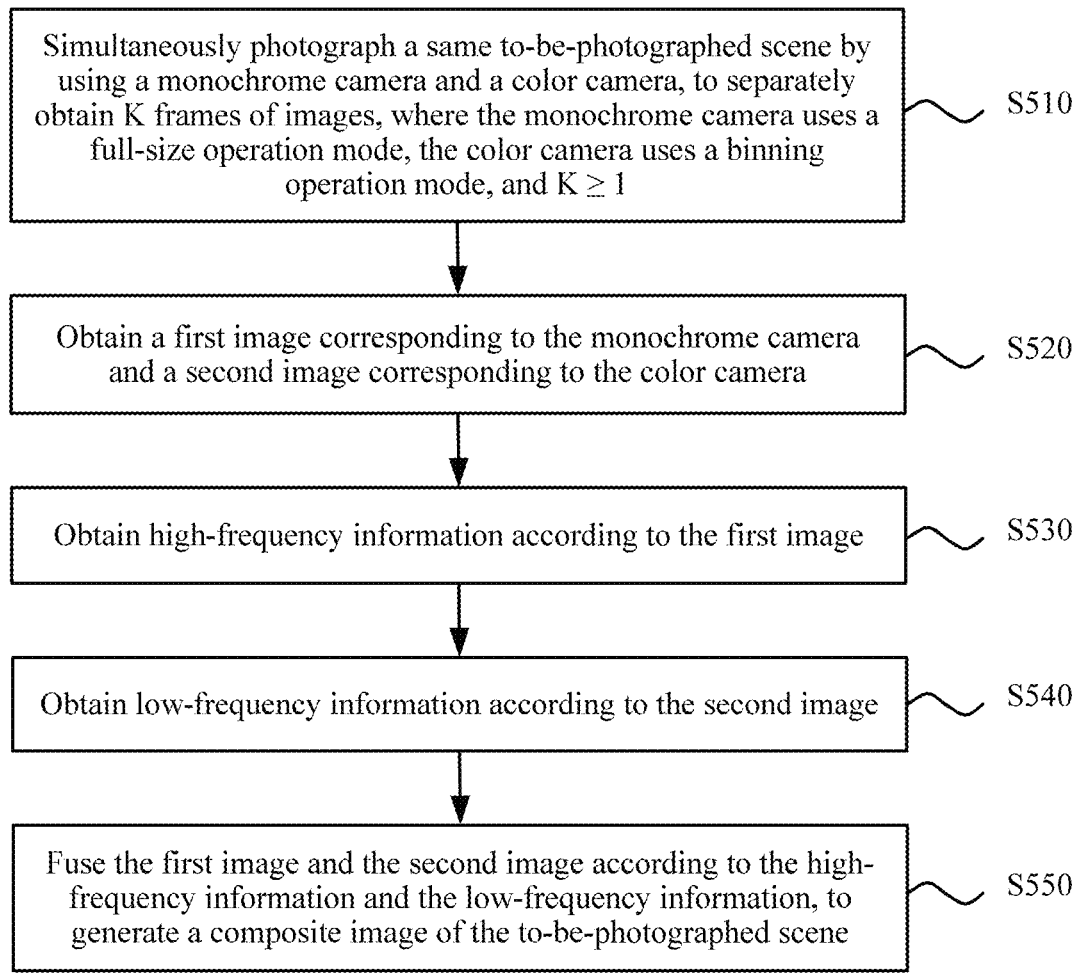
FIG. 5 is a schematic flowchart of a photographing method for a terminal according to an embodiment of the present invention.

The following describes a photographing method for a terminal in an embodiment of the present invention in detail with reference to FIG. 5. It should be noted that the photographing method for a terminal in FIG. 5 may be performed by the above-described terminal, and a specific procedure of the method is the same as or corresponding to a processing procedure of a processor of the foregoing terminal. To avoid repetition, repeated description is appropriately omitted.

FIG. 5 is a schematic flowchart of a method 500 used by a terminal to photograph according to an embodiment of the present invention. The terminal includes a monochrome camera and a color camera, and the method 500 includes the following.

S510. Simultaneously photograph a same to-be-photographed scene by using the monochrome camera and the color camera, to separately obtain K frames of images, where the monochrome camera uses a full-size operation mode, the color camera uses a binning operation mode, and $K \geq 1$.

S520. Obtain a first image corresponding to the monochrome camera and a second image corresponding to the color camera.

S530. Obtain high-frequency information according to the first image.

S540. Obtain low-frequency information according to the second image.

S550. Fuse the first image and the second image according to the high-frequency information and the low-frequency information, to generate a composite image of the to-be-photographed scene.

Alternatively, in this embodiment of the present invention, the "simultaneously photographing a same to-be-photographed scene by using the monochrome camera and the color camera, to separately obtain K frames of images" in step S510 may also be understood as "performing K times of photographing on the same to-be-photographed scene by using the monochrome camera and the color camera, and simultaneously capturing, by the monochrome camera and the color camera, one frame of image separately during each photographing".

In this embodiment of the present invention, the monochrome camera and the color camera may be installed on the terminal. During each photographing, the monochrome camera and the color camera simultaneously capture an image, so that a possibility of hand trembling between cameras or object motion in a scene is reduced, that is, the monochrome camera and the color camera remain relatively static. In an image capturing process, the monochrome camera uses the full-size operation mode, and the color camera uses the binning operation mode. The terminal can separately obtain the K frames of images by using the monochrome camera and the color camera to simultaneously photograph the to-be-photographed scene, obtain the first image corresponding to the monochrome camera according to K frames of monochrome images corresponding to the monochrome camera, and obtain the second image corresponding to the color camera according to K frames of color images corresponding to the color camera. Then, the terminal extracts the high-frequency information (such as full-resolution detail information) and the low-frequency information (such as brightness information and color information) of the to-be-photographed scene, and fuses the first image and the second image according to this information, to generate the composite image of the to-be-photographed scene. Quality of the composite image is better than that of any one frame of the K frames of images obtained through the K times of photographing. The photographing method for a terminal in this embodiment of the present invention is particularly applicable to low illumination or a night scene, so as to improve image quality.

Optionally, in an embodiment, S550 includes processing brightness of the first image based on the low-frequency information and by using the second image as a reference image, to obtain a third image, performing upsampling processing on the second image based on the high-frequency information, to obtain a fourth image, where a resolution of the fourth image is the same as or equivalent to that of the first image, performing registration on the fourth image by using the third image as a reference image, to obtain a fifth image, and fusing the fifth image and the third image, to generate the composite image of the to-be-photographed scene.

Optionally, in an embodiment, when $K \geq 2$, S520 includes obtaining K frames of images corresponding to the monochrome camera and K frames of images corresponding to the color camera, performing temporal noise reduction on the K frames of images corresponding to the monochrome camera, to obtain the first image, and performing temporal noise reduction on the K frames of images corresponding to the color camera, to obtain the second image.

Optionally, the performing temporal noise reduction on the K frames of images corresponding to the monochrome camera includes performing a global image registration operation on the K frames of images corresponding to the monochrome camera by using a global motion relationship corresponding to the color camera.

Optionally, in an embodiment, the method 500 may further include performing spatial noise reduction on the composite image of the to-be-photographed scene.

Figure 6:
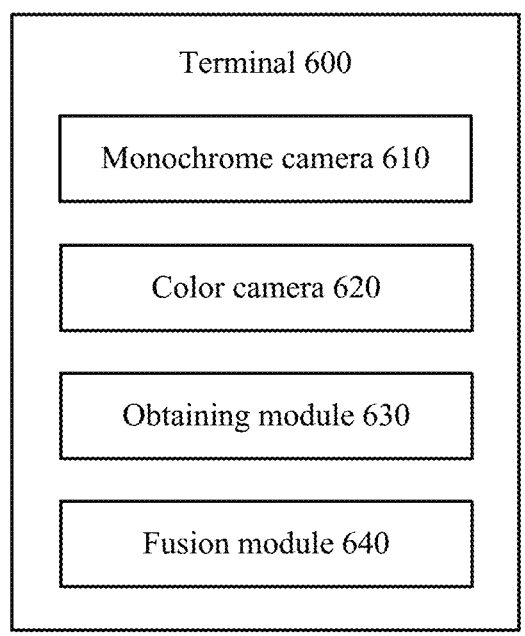
FIG. 6 is a schematic block diagram of a terminal according to an embodiment of the present invention.

The following describes a terminal 600 according to an embodiment of the present invention with reference to FIG. 6, and the terminal 600 can implement each step of the foregoing photographing method for a terminal. For brevity, details are not described herein again.

FIG. 6 is a schematic block diagram of the terminal according to this embodiment of the present invention. As shown in FIG. 6, the terminal 600 may include a monochrome camera 610 and a color camera 620, configured to simultaneously photograph a same to-be-photographed scene, to separately obtain K frames of images, where the monochrome camera uses a full-size operation mode, the color camera uses a binning operation mode, and K≥1, an obtaining module 630, configured to obtain a first image corresponding to the monochrome camera and a second image corresponding to the color camera, further configured to obtain high-frequency information according to the first image, and further configured to obtain low-frequency information according to the second image, and a fusion module 640, configured to fuse the first image and the second image according to the high-frequency information and the low-frequency information that are obtained by the obtaining module 630, to generate a composite image of the to-be-photographed scene.

Optionally, in an embodiment, the fusion module 640 is specifically configured to process brightness of the first image based on the low-frequency information and by using the second image as a reference image, to obtain a third image, perform upsampling processing on the second image based on the high-frequency information, to obtain a fourth image, perform registration on the fourth image by using the third image as a reference image, to obtain a fifth image, and fuse the fifth image and the third image, to generate the composite image of the to-be-photographed scene.

Optionally, in an embodiment, the obtaining module 630 is specifically configured to obtain K frames of images corresponding to the monochrome camera and K frames of images corresponding to the color camera, where K≥2, perform temporal noise reduction on the K frames of images corresponding to the monochrome camera, to obtain the first image, and perform temporal noise reduction on the K frames of images corresponding to the color camera, to obtain the second image.

Optionally, in an embodiment, the performing temporal noise reduction on the K frames of images corresponding to the monochrome camera includes performing a global image registration operation on the K frames of images corresponding to the monochrome camera by using a global motion relationship corresponding to the color camera.

Optionally, in an embodiment, the terminal 600 may further include a noise reduction module, configured to perform spatial noise reduction on the composite image of the to-be-photographed scene.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed apparatus and method may be implemented in other manners. For example, the described apparatus embodiment is merely an example.

For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   simultaneously photographing, by a terminal comprising a monochrome camera and a color camera, a to-be-photographed scene using the monochrome camera and the color camera;
   obtaining first K frames of images corresponding to the monochrome camera, wherein the monochrome camera uses a full-size operation mode;
   obtaining second K frames of images corresponding to the color camera, wherein the color camera uses a binning operation mode, and wherein K≥1;
   obtaining a first image corresponding to the monochrome camera and a second image corresponding to the color camera;
   obtaining high-frequency information according to the first image;
   obtaining low-frequency information according to the second image; and
   fusing the first image and the second image according to the high-frequency information and the low-frequency information to generate a composite image of the to-be-photographed scene, wherein fusing the first image and the second image according to the high-frequency information and the low-frequency information comprises:
  processing a brightness of the first image according to the low-frequency information and using the second image as a first reference image to obtain a third image; and
  performing upsampling processing on the second image according to the high-frequency information to obtain a fourth image.

2. The method according to claim 1, wherein the fusing the first image and the second image according to the high-frequency information and the low-frequency information further comprises:
  performing registration on the fourth image using the third image as a second reference image to obtain a fifth image.

3. The method according to claim 2, wherein the fusing the first image and the second image according to the high-frequency information and the low-frequency information further comprises:
  fusing the fifth image and the third image to generate the composite image of the to-be-photographed scene.

4. The method according to claim 1, wherein the obtaining the first image corresponding to the monochrome camera and the second image corresponding to the color camera comprises:
  obtaining the first K frames of images corresponding to the monochrome camera;
  obtaining the second K frames of images corresponding to the color camera, wherein K≥2;
  performing first temporal noise reduction on the first K frames of images corresponding to the monochrome camera to obtain the first image; and
  performing second temporal noise reduction on the second K frames of images corresponding to the color camera to obtain the second image.

5. The method according to claim 4, wherein the performing the first temporal noise reduction on the first K frames of images corresponding to the monochrome camera comprises:
  performing a global image registration operation on the first K frames of images corresponding to the monochrome camera using a global motion relationship corresponding to the color camera.

6. The method according to claim 5, wherein the method further comprises:
  performing spatial noise reduction on the composite image of the to-be-photographed scene.

7. A terminal, comprising:
  a monochrome camera;
  a color camera, the monochrome camera and the color camera configured to:
    simultaneously photograph a to-be-photographed scene,
  the monochrome camera further configured to:
    obtain first K frames of images corresponding to the monochrome camera, wherein the monochrome camera uses a full-size operation mode,
  the color camera further configured to:
    obtain second K frames of images corresponding to the color camera, wherein the color camera uses a binning operation mode, and wherein K≥1; and
  a computer including a non-transitory computer-readable medium storing program modules executable by the computer, the program modules including:
    an obtaining module, configured to:
      obtain a first image corresponding to the monochrome camera and a second image corresponding to the color camera,
      obtain high-frequency information according to the first image, and
      obtain low-frequency information according to the second image; and
    a fusion module, configured to:
      fuse the first image and the second image according to the high-frequency information and the low-frequency information to generate a composite image of the to-be-photographed scene;
      Process a brightness of the first image according to the low-frequency information and using the second image as a first reference image to obtain a third image; and
      perform upsampling processing on the second image according to the high-frequency information to obtain a fourth image.

8. The terminal according to claim 7, wherein the fusion module is configured to:
  perform registration on the fourth image using the third image as a second reference image to obtain a fifth image.

9. The terminal according to claim 8, wherein the fusion module is configured to:
  fuse the fifth image and the third image to generate the composite image of the to-be-photographed scene.

10. The terminal according to claim 7, wherein the obtaining module is configured to:
  obtain the first K frames of images corresponding to the monochrome camera; and
  obtain the second K frames of images corresponding to the color camera, wherein K≥2;
  and wherein the program modules further include a noise reduction module configured to:
  perform first temporal noise reduction on the first K frames of images corresponding to the monochrome camera to obtain the first image; and
  perform second temporal noise reduction on the second K frames of images corresponding to the color camera to obtain the second image.

11. The terminal according to claim 10, wherein the noise reduction module is further configured to:
  perform spatial noise reduction on the composite image of the to-be-photographed scene.

12. A terminal, comprising:
  a monochrome camera;
  a color camera;
  a processor; and
  a non-transitory computer-readable storage medium storing a program to be executed by the processor, the program including instructions to:
    cause the monochrome camera and the color camera to simultaneously photograph a to-be-photographed scene;
    obtain first K frames of images corresponding to the monochrome camera, wherein the monochrome camera uses a full-size operation mode;
    obtain second K frames of images corresponding to the color camera, wherein the color camera uses a binning operation mode, and wherein K≥1;

obtain a first image corresponding to the monochrome camera and a second image corresponding to the color camera;

obtain high-frequency information according to the first image;

obtain low-frequency information according to the second image; and fuse the first image and the second image according to the high-frequency information and the low-frequency information to generate a composite image of the to-be-photographed scene; and wherein the instructions to fuse the first image and the second image include instructions to:

process brightness of the first image according to the low-frequency information and using the second image as a first reference image to obtain a third image; and perform upsampling processing on the second image according to the high-frequency information to obtain a fourth image.

13. The terminal according to claim 12, wherein the instructions to fuse the first image and the second image further include instructions to:

perform registration on the fourth image by using the third image as a second reference image, to obtain a fifth image.

14. The terminal according to claim 13, wherein the instructions to fuse the first image and the second image further include instructions to:

fuse the fifth image and the third image to generate the composite image of the to-be-photographed scene.

15. The terminal according to claim 12, wherein the instructions to obtain the first image and the second image corresponding to the color camera further include instructions to:

obtain the first K frames of images corresponding to the monochrome camera; and obtain the second K frames of images corresponding to the color camera, wherein $K \geq 2$;

perform first temporal noise reduction on the first K frames of images corresponding to the monochrome camera to obtain the first image; and perform second temporal noise reduction on the second K frames of images corresponding to the color camera to obtain the second image.

16. The terminal according to claim 15, wherein the instructions to perform the first temporal noise reduction comprise:

perform a global image registration operation on the first K frames of images corresponding to the monochrome camera using a global motion relationship corresponding to the color camera.

17. The terminal according to claim 16, wherein the program further includes instructions to:

perform spatial noise reduction on the composite image of the to-be-photographed scene.

* * * * *

UNITED STATES PATENT AND TRADEMARK OFFICE
CERTIFICATE OF CORRECTION

PATENT NO. : 10,827,140 B2  
APPLICATION NO. : 16/342299  
DATED : November 3, 2020  
INVENTOR(S) : Congchao Zhu Page 1 of 1

It is certified that error appears in the above-identified patent and that said Letters Patent is hereby corrected as shown below:

In the Claims

In Column 22, Line 17, Claim 7, delete "Process" and insert --process--.

Signed and Sealed this  
Second Day of February, 2021

Drew Hirshfeld  
*Performing the Functions and Duties of the*  
*Under Secretary of Commerce for Intellectual Property and*  
*Director of the United States Patent and Trademark Office*